(12) United States Patent
Muhammad

(10) Patent No.: US 8,786,264 B2
(45) Date of Patent: Jul. 22, 2014

(54) DCDC CONVERTER WITH CONVERTER MODULES THAT CAN BE DYNAMICALLY ENABLED OR DISABLED

(75) Inventor: Khurram Muhammad, Garland, TX (US)

(73) Assignee: BlackBerry Limited, Waterloo (CA)

( * ) Notice: Subject to any disclaimer, the term of this patent is extended or adjusted under 35 U.S.C. 154(b) by 261 days.

(21) Appl. No.: 13/348,474

(22) Filed: Jan. 11, 2012

(65) Prior Publication Data
US 2013/0176011 A1  Jul. 11, 2013

(51) Int. Cl.
*G05F 1/00*  (2006.01)
(52) U.S. Cl.
USPC .......................... 323/272; 323/269; 323/271
(58) Field of Classification Search
USPC .......................................... 323/269, 271, 272
See application file for complete search history.

(56) References Cited

U.S. PATENT DOCUMENTS

| | | | |
|---|---|---|---|
| 6,611,132 B2 | 8/2003 | Nakagawa et al. | |
| 7,109,692 B1 | 9/2006 | Wu et al. | |
| 7,218,085 B2 | 5/2007 | Abedinpour et al. | |
| 7,298,197 B2 | 11/2007 | Duerbaum et al. | |
| 7,342,388 B2 | 3/2008 | Ao | |
| 7,391,196 B2 | 6/2008 | Fosler | |
| 7,428,159 B2 | 9/2008 | Leung et al. | |
| 7,453,246 B2 | 11/2008 | Qiu et al. | |
| 7,498,786 B2 | 3/2009 | Prinz et al. | |
| 7,508,177 B2 | 3/2009 | Aiura et al. | |
| 7,638,991 B1 | 12/2009 | Kobayashi | |
| 7,772,811 B1 | 8/2010 | Jain et al. | |
| 7,852,053 B2 * | 12/2010 | Martin et al. | 323/272 |
| 7,855,905 B2 | 12/2010 | Leung et al. | |
| 7,868,600 B2 | 1/2011 | Qiu et al. | |
| 7,902,800 B2 | 3/2011 | Jain et al. | |
| 2002/0135338 A1 * | 9/2002 | Hobrecht et al. | 323/272 |
| 2005/0280401 A1 | 12/2005 | Plankensteiner | |
| 2006/0038543 A1 | 2/2006 | Hazucha | |

(Continued)

FOREIGN PATENT DOCUMENTS

| | | |
|---|---|---|
| EP | 1608066 | 12/2005 |
| JP | 8149804 | 6/1996 |
| JP | 2003319645 | 11/2003 |
| WO | 2007138513 | 12/2007 |

OTHER PUBLICATIONS

J.E. Baggio, H.L. Hey, J.R. Pinheiro, "An Improved Full-Load-Range Isolated ZVS-PWM DC-DC Converter" Federal University of Santa Maria, Mar. 2001.

(Continued)

*Primary Examiner* — Adolf Berhane
*Assistant Examiner* — Gary Nash
(74) *Attorney, Agent, or Firm* — Novak Druce Connolly Bove + Quigg LLP

(57) ABSTRACT

Provided is an apparatus comprising a DCDC converter having a plurality of converter modules each configured to convert current from a first voltage level to another voltage form. In accordance with an embodiment of the disclosure, the converter modules are configured to be dynamically enabled or disabled such that only each converter module that has been enabled converts current for an output of the DCDC converter. Any inefficiency that would have been introduced by converter modules that are not needed are mitigated or eliminated altogether. The effect is that efficiency can be improved during low load conditions when there is no need to enable all of the converter modules.

16 Claims, 12 Drawing Sheets

(56) References Cited

U.S. PATENT DOCUMENTS

| | | | |
|---|---|---|---|
| 2008/0157732 A1 | 7/2008 | Williams | |
| 2008/0157733 A1 | 7/2008 | Williams | |
| 2008/0158915 A1 | 7/2008 | Williams | |
| 2009/0039842 A1 | 2/2009 | Chen | |
| 2009/0153110 A1* | 6/2009 | Huang | 323/271 |
| 2009/0236917 A1 | 9/2009 | Bettenwort | |
| 2010/0109622 A1* | 5/2010 | Miki et al. | 323/272 |
| 2010/0286836 A1* | 11/2010 | Shaver et al. | 700/287 |
| 2011/0176249 A1 | 7/2011 | Shinoda et al. | |

OTHER PUBLICATIONS

Dudrick J., "Soft-Switching PS-PWM DC-DC Converter for Full-Load Range Applications" IEEE Xplore vol. 57, Issue 8, Dec. 2009.

Yungtaek Jang, Milan M. Jovanovic, "A New Family of Full-Bridge ZVS Converters", IEEE Transactions on Power Electronics, vol. 19, No. 3, May 2004.

Demercil de Souza Oliveira, Jr., Ivo Barbi, "A Three-Phase ZVS PWM DC/DC Converter With Asymmetrical Duty Cycle for High Power Applications", IEEE Transactions on Power Electronics, vol. 20, No. 2, Mar. 2005.

Jaroslav Dudrik, Vladimir Ruščin, Marcel Bodor, Daniel Nistor Trip, Pavol Špánik, "Soft Switching Full-Bridge PWM DC/DC Converter Using Secondary Snubber", Slovak Research and Development Agency, 2009.

Jaroslav Dudrik, Juraj Oetter, "High-Frequency Soft-Switching DC-DC Converters for Voltage and Current DC Power Sources", Acta Polytechnica Hungarica, vol. 4, No. 2, 2007.

J. R. Pinheiro, J. E. Baggio, "Isolated Interleaved-Phase-Shift-PWM dc-dc ZVS Converters," Federal University of Santa Maria, Nov. 2003.

DS200976, "LM3224 615kHz/1.25MHz Step-up PWM DC/DC Converter", National Semiconductor Corporation, Sep. 2005.

DS200712, "LM2716 Dual (Step-Up and Step-Down) PWM DC/DC Converter", National Semiconductor Corporation, Nov. 2005.

MAX748A / MAX763A "3.3V, Step-Down, Current-Mode PWM DC-DC Converters", MAXIM, Sep. 1993.

Brad Lehman, Richard M. Bass, "Switching Frequency Dependent Averaged Models for PWM DC-DC Converters", IEEE Transactions on Power Electronics, vol. 11, No. 1, Jan. 1996.

Dakshina Murthy Bellur, Marian K. Kazimierczuk "Review of Zero-Current Switching Flyback PWM DC-DC Converters", Wright State University, Sep. 2009.

DS101273, "LM2622 600kHz/1.3MHz Step-up PWM DC/DC Converter", National Semiconductor Corporation, May 2004.

ISL62870, "PWM DC/DC Voltage Regulator Controller", Intersil, Aug. 2008.

TD1507, "3A 150KHZ PWM Buck DC/DC Converter", Techcode Semiconductor Limited, Dec. 2005.

Extended European Search Report dated Sep. 25, 2012 from corresponding European Patent Application No. 12150761.0.

English Language Abstract of JP 2003319645; published Nov. 7, 2003.

English Language Abstract of JP 8149804; published Jun. 7, 1996.

* cited by examiner

US 8,786,264 B2

DCDC CONVERTER WITH CONVERTER MODULES THAT CAN BE DYNAMICALLY ENABLED OR DISABLED

FIELD OF THE DISCLOSURE

This disclosure relates to electronics, and more particularly to direct current to direct current (DCDC) converters.

BACKGROUND

DCDC converters are electronic circuits that convert a source of direct current from one voltage level to another voltage level. DCDC converters are used in a wide variety of applications including portable electronic devices such as cellular phones and laptop computers. DCDC converters are also used in many other applications.

BRIEF DESCRIPTION OF THE DRAWINGS

Embodiments will now be described with reference to the attached drawings in which.

DETAILED DESCRIPTION OF EMBODIMENTS

It should be understood at the outset that although illustrative implementations of one or more embodiments of the present disclosure are provided below, the disclosed systems and/or methods may be implemented using any number of techniques, whether currently known or in existence. The disclosure should in no way be limited to the illustrative implementations, drawings, and techniques illustrated below, including the exemplary designs and implementations illustrated and described herein, but may be modified within the scope of the appended claims along with their full scope of equivalents.

According to an aspect of the disclosure, there is provided an apparatus comprising a Direct Current to Direct Current 'DCDC' converter having a plurality of converter modules each configured to convert current at a first voltage level to another voltage form; wherein the converter modules are configured to be dynamically enabled or disabled such that only each converter module that have been enabled converts current for an output of the DCDC converter.

According to another aspect of the disclosure, there is provided a method for execution in an apparatus comprising a Direct Current to Direct Current 'DCDC' converter having a plurality of converter modules each configured to convert current at a first voltage level to another voltage form, the method comprising: determining on an ongoing basis an estimated total power usage for at least one circuit being powered by the DCDC converter; determining which converter module(s) to enable and which converter module(s) to disable based on the estimated total power usage; and dynamically enabling or disabling the converter modules accordingly.

According to another aspect of the disclosure, there is provided a non-transitory computer readable medium having stored thereon computer-executable instructions that when executed on a processor of an apparatus implement the method summarised above.

Other aspects and features of the disclosure will become apparent, to those ordinarily skilled in the art, upon review of the following description of the specific embodiments of the invention.

Introduction

Many DCDC converters use Buck, Boost or Buck-Boost topologies to provide a load current through an inductor under control of a switch. The switch turns on for a longer duration of time when a higher load current is to be delivered, and turns on for a shorter duration of time when a lower load current is to be delivered. An output voltage can therefore be controlled by controlling a duty-cycle of the switch. This disclosure provides several illustrated examples of DCDC converters. Whilst the illustrated examples focus on DCDC converters featuring the Buck topology, it is to be understood that embodiments of the disclosure are applicable to other topologies including Boost and Buck-Boost topologies. A large literature exists that describes the operation of DCDC converters in different modes (e.g. continuous/discontinuous etc.).

Figure 1:
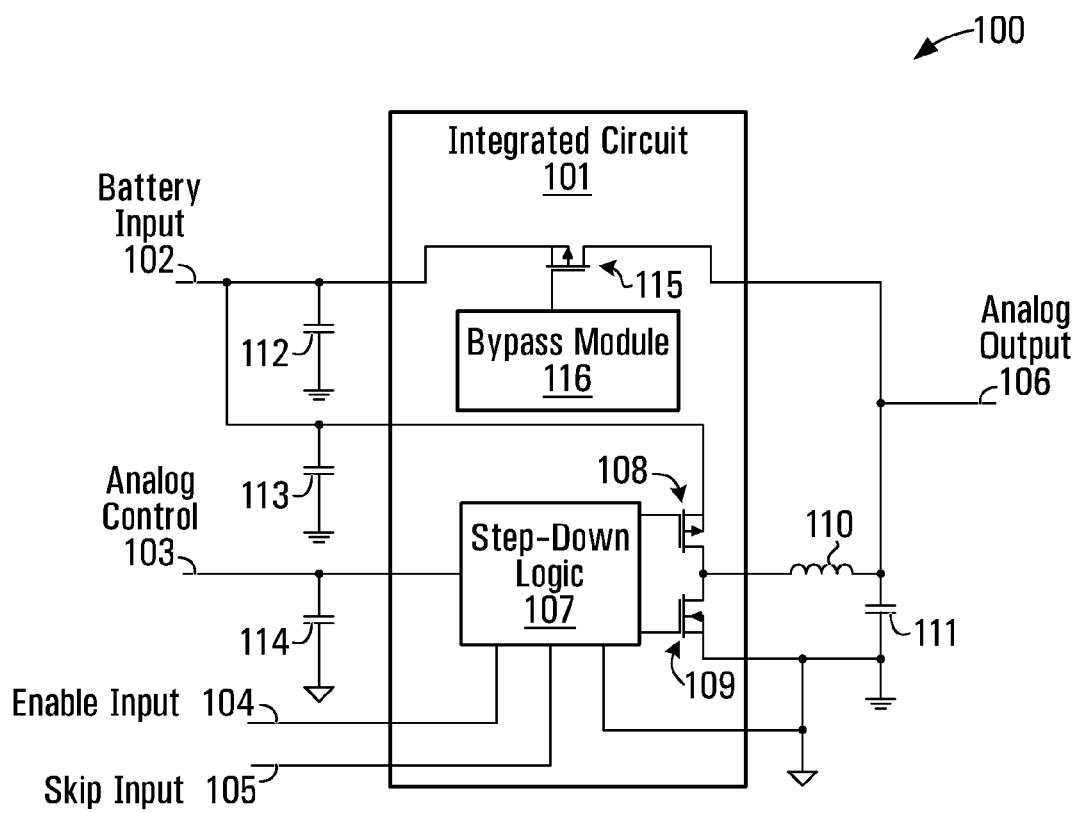
FIG. 1 is a block diagram of a DCDC converter featuring a Buck topology.

Referring first to FIG. 1, shown is a block diagram of a DCDC converter 100 featuring the Buck topology. The DCDC converter 100 has an integrated circuit 101 having a battery input 102, an analog control 103, and an analog output 106. The integrated circuit 101 has step-down logic 107 and a switch 108,109, which includes a P-channel FET 108 and an N-channel FET 109. The DCDC converter 100 has a filter 110,111 including an inductor 110 and a capacitor 111 at the analog output 106. In some implementations, the DCDC converter 100 has additional inputs 104,105 and additional components 112,113,114,115,116 as will be described later.

The operation of the DCDC converter 100 will now be described by way of example. The battery input 102 provides a first voltage level for example between 2.7V to 5.5V depending on a source of the DC voltage. The first voltage level might be greater than what various devices might use. Supplying a DC voltage that is too great for such devices can cause improper operation or damage. Therefore, the DCDC converter 100 can operate to convert current at the first voltage level to a lower voltage level. As a result, for example, the analog output 106 might be as low as 0.4V or as high as the first voltage level from the battery input 102.

The analog output 106 is controlled using the analog control 103. The analog control 103 might for example be adjustable in a range of 0.2V to 2.1V. The step-down logic 107 accepts the analog control 103 and drives the switch 108,109 using PWM based on the analog control 103. During a first stage, the PWM signal turns the P-channel FET 108 on and the N-channel FET 109 off thereby causing a voltage to build up at the analog output 106 via the inductor 110. During this first stage, the inductor 110 is charged. Subsequently, during a second stage the PWM signal turns the P-channel FET 108 off and the N-channel FET 109 on thereby providing a path to ground for current going through the inductor 110. During this second stage, the inductor 110 discharges current onto the load. The first and second stages repeat. During this switching operation, the switch 108,109 converts current at the first voltage level to another voltage form, and the inductor 110 transforms the voltage form to smooth current for the analog output 106. The term "another voltage form" is used throughout this disclosure in a non-limiting manner to cover a voltage level or a voltage waveform having an effective voltage level (e.g. having a DC voltage plus ripple voltage).

Note that turning the switch 108,109 on and off can cause the current flowing through the inductor 110 to vary above and below a desired value and thus create voltage ripple. The voltage ripple can cause a resulting ripple current at the analog output. However, in the illustrated example, the capacitor 111 at the analog output 106 reduces ripple effects of PWM in order to achieve a smoother analog output 106. The capacitor 111 can provide small current locally to the load thereby reducing the impact of the voltage ripple.

In the illustrated example, the DCDC converter 100 operates under open-loop control. In alternative implementations, the DCDC converter 100 has feedback (not shown) from the analog output 106 to the step-down logic 107 in order to provide closed-loop control over the analog output 106. This might for example involve an error amplifier/comparator (not shown) in order to compare the analog output 106 to the analog control 103 and to adjust the duty cycle of the PWM signal accordingly. An example of closed-loop control is described later with reference to FIG. 3.

In the illustrated example, the switch 108,109 include the P-channel FET 108 and the N-channel FET. Each FET disclosed in this application might for example be a metal-oxide-semiconductor field-effect transistor (MOSFET), or other transistor. In alternative implementations, the N-channel FET 109 is replaced with a diode with an anode connected to ground and a cathode connected to the inductor 110. This diode is reverse biased when the P-channel FET 108 is active and automatically becomes forward biased when a current is flowing though the inductor and the P-channel FET 108 is turned off by the step-down logic 107. Other switches are possible. A large literature exists that describes various topologies of DCDC converters that can step the input voltage down (Buck) or up (Boost) or both (Buck-Boost). More generally, any appropriately configured switch and switching logic can be implemented for converting current at the first voltage level to another voltage form.

In the illustrated example, the filter 110,111 includes the inductor 110 and the capacitor 111. In specific implementations, the inductor 110 has an inductance of L=4.7 µH and the capacitor 106 has a capacitance of C=4.7 µF. More generally, any appropriately configured filter can be implemented. In alternative implementations, no filter is implemented.

In some implementations, the battery input 102 and the analog control 103 also have capacitors 112,113,114 for smoothing their respective inputs. In specific implementations, each capacitor 112,113 for the battery input 102 has a capacitance of C=4.7 µF, and the capacitor for the analog control 103 has a capacitance of C=1000 µF. Other implementations with or without capacitors are possible.

In some implementations, as shown in the illustrated example, the DCDC converter 100 includes a power transistor 115 configured to supply the battery input 102 directly to the analog output 106 in response to a bypass module 116. The bypass module 116 can be turned to a low-dropout voltage regulator (LDO) by connected external elements outside of the integrated circuit 101 while using the power transistor 115. For lower output voltages, the bypass module 116 is turned off. For higher output voltages, the power transistor 115 bypasses the step-down logic 107 and the switch 108,109 when it is desired to supply current directly from the battery input 102 while avoiding any inefficiencies introduced by the step-down logic 107 and the switch 108,109. In one embodiment, the step-down logic 107 could be selectively enabled or disabled using the enable input 104. Alternatively, the step-down logic 107 can remain powered on turning the power transistor 115 on thereby shorting the analog output 106 to the battery input 102 in order to supplement the current provided by the pair of transistors 108,109. The analog output 106 might for example provide up to 2.5 A of current depending on the size of the transistors 108,109,115.

The transistors 108,109,115 are selected to be large enough so that the DCDC converter 100 is capable of providing the maximum current (e.g. 2.5 A) even though at any given time the DCDC converter 100 might provide significantly less current (e.g. 500 mA) depending on load conditions. Unfortunately, as load conditions decrease, the efficiency of the DCDC converter 100 can also decrease. In particular, rapidly switching the pair of transistors 108,109 on and off using PWM has inefficiencies due to capacitances inherent with the gates of the transistors 108,109. Each time a transistor is turned on or off, capacitance at its gate is charged or discharged. Since the capacitances are roughly proportional to the size of the transistors 108,109, the inefficiencies are relatively large under low load conditions.

In addition to inefficiencies caused by dynamically switching the transistors 108,109 on and off, there are conduction losses through the on resistance of the transistors 108,109. Also, there are diode conduction losses as the second transistor 109 is used as a diode. Furthermore, there are Equivalent Series Resistance (ESR) losses in the inductor 110 and the capacitor 111 on the analog output 106. There may be other inefficiencies not specifically mentioned here. These losses might remain the same while output current of the DCDC converter 100 is reduced under low load conditions. Therefore, as will be shown in FIGS. 2A through 2D, inefficiencies tend to be greatest under low load conditions.

Referring now to FIGS. 2A through 2D, shown are graphs showing efficiency of the DCDC converter 100 shown in FIG. 1. These graphs illustrate efficiency and power consumption while the DCDC converter 100 is implemented in a mobile device transmitting with various radio access technologies. Note that these graphs are only examples and that other results might be possible depending on a number of conditions and factors.

Figure 2A:
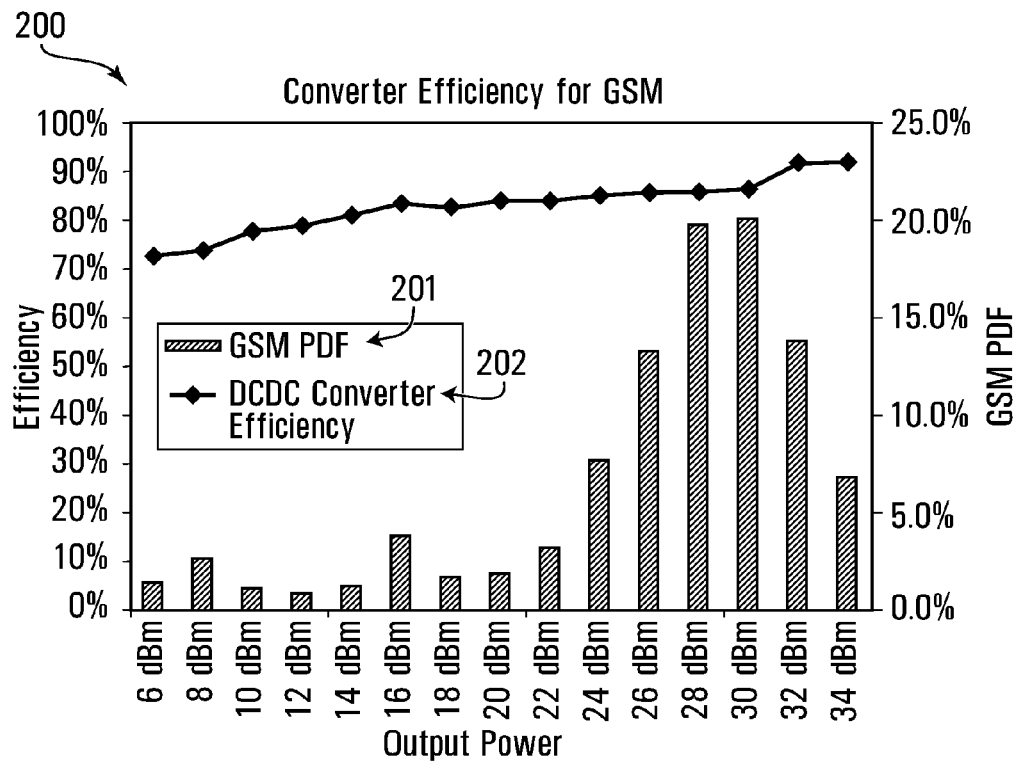
FIGS. 2A through 2D are graphs showing efficiency of the DCDC converter shown in FIG. 1.

Referring first to FIG. 2A, shown is a graph 200 showing efficiency of the DCDC converter 100 for Global System for Mobile Communications (GSM). The graph includes two plots over output power at an antenna of the mobile device: a first plot 201 for GSM probability density function (PDF) of the output power, and a second plot 202 for DCDC converter efficiency. The first plot 201 for GSM PDF indicates that output power is often in the range of 24 dBm to 34 dBm. The second plot 202 for DCDC converter efficiency indicates that efficiency tends to increase as output power increases.

Figure 2B:
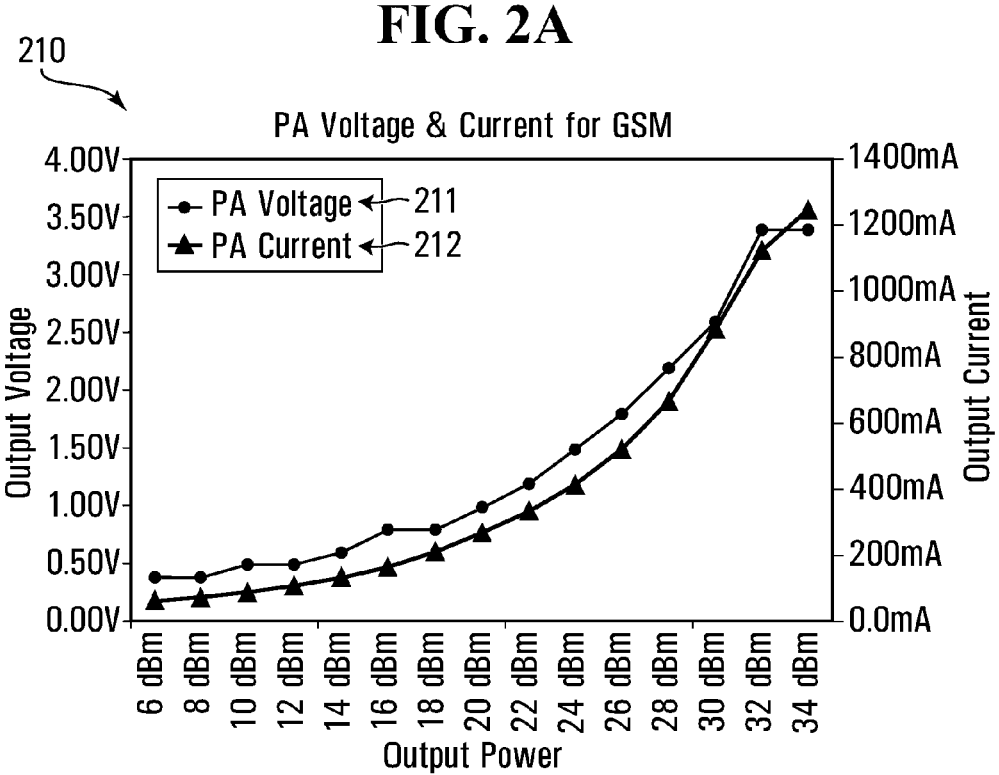

Referring now to FIG. 2B, shown is a graph 210 showing power consumption of the DCDC converter 100 for GSM. The graph includes two plots over output power at the antenna: a first plot 211 for Power Amplifier (PA) voltage, and a second plot 212 for PA Current. The first plot 211 for PA voltage indicates that PA voltage tends to increase as output power increases. The second plot 212 for PA Current similarly indicates that PA current tends to increase as output power increases.

Figure 2C:
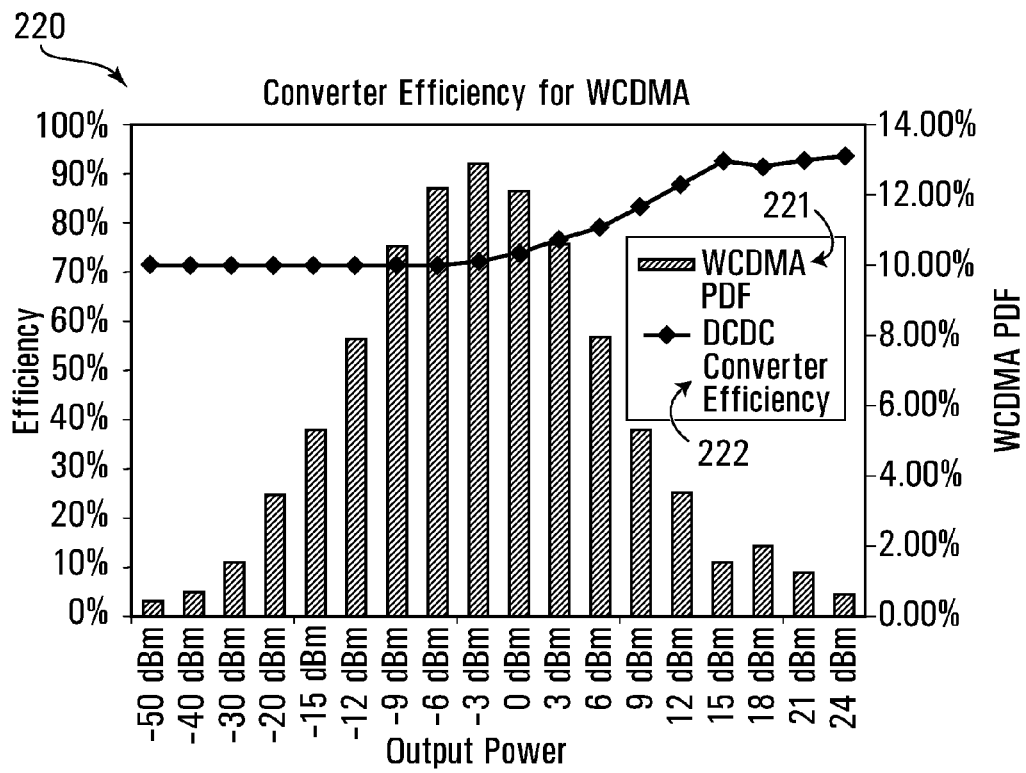

Referring now to FIG. 2C, shown is a graph 220 showing efficiency of the DCDC converter 100 for WCDMA (Wideband Code Division Multiple Access). The graph includes two plots over output power at an antenna of the mobile device: a first plot 221 for GSM PDF, and a second plot 222 for DCDC converter efficiency. The first plot 221 for GSM PDF indicates that output power is often in the range of −20 dBm to 12 dBm. The second plot 222 for DCDC converter efficiency indicates that efficiency tends to increase as output power increases past −3 dBm.

Figure 2D:
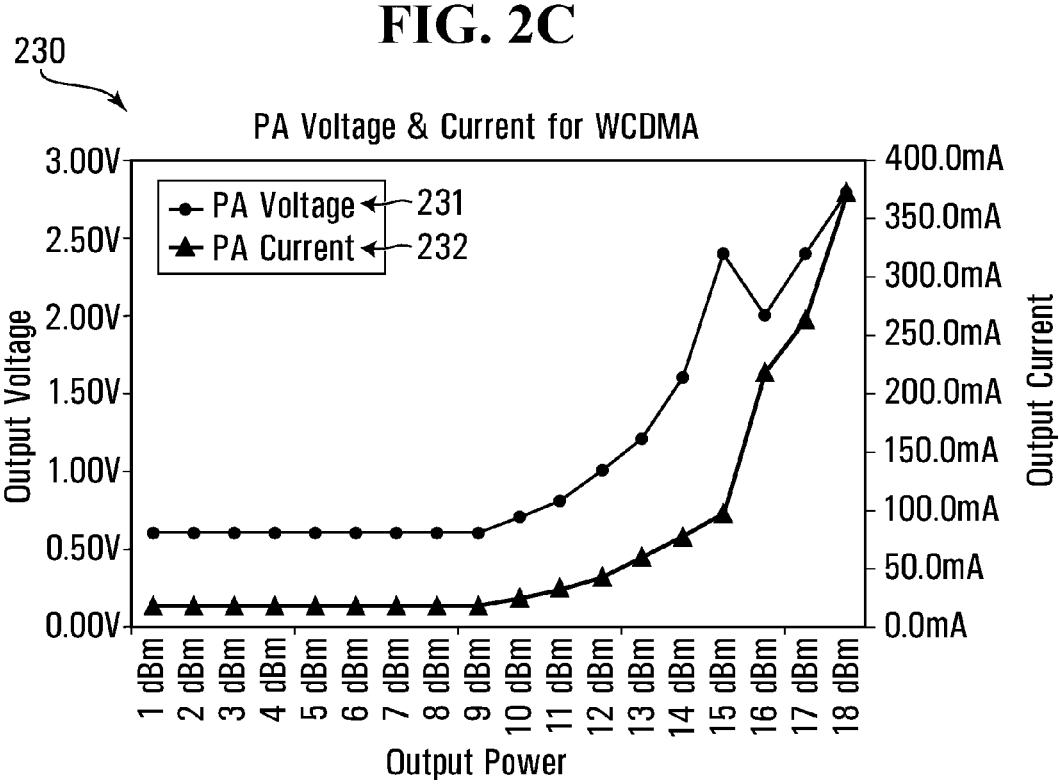

Referring now to FIG. 2D, shown is a graph 230 showing power consumption of the DCDC converter 100 for WCDMA. The graph includes two plots over output power at the antenna: a first plot 231 for PA voltage, and a second plot 232 for PA Current. The first plot 231 for PA voltage indicates that PA voltage tends to increase as output power increases. The second plot 232 for PA Current similarly indicates that PA current tends to increase as output power increases past −3 dBm.

Figure 3:
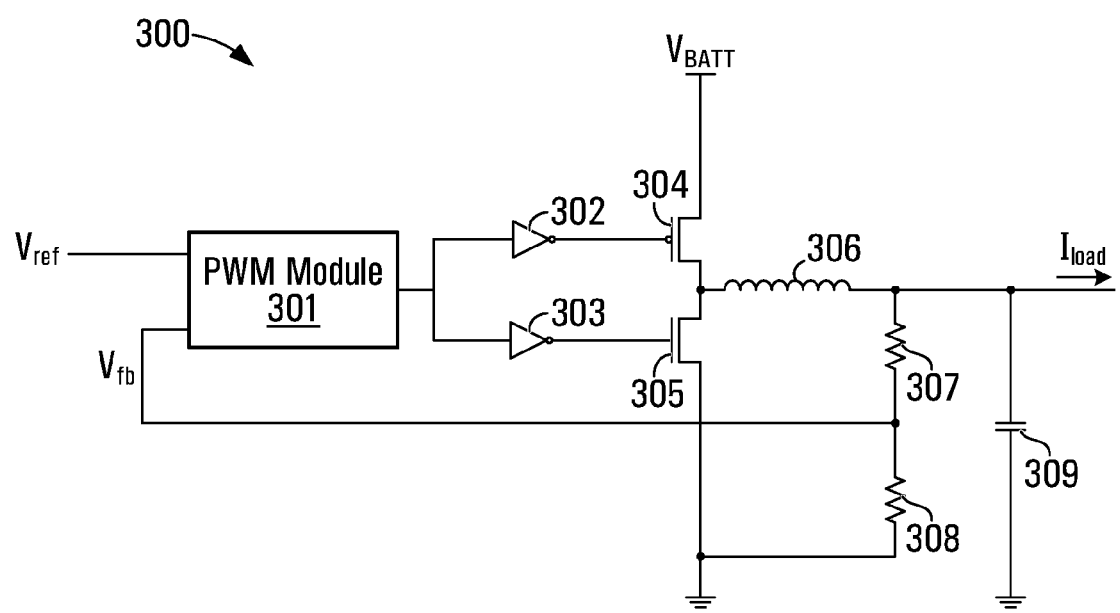
FIG. 3 is a block diagram of another DCDC converter featuring a Buck topology.

Note that the foregoing issue of power efficiency is not unique to the DCDC converter 100 shown in FIG. 1. Other DCDC converters experience this issue, regardless of whether they feature the Buck topology or other topologies such as Boost and Buck-Boost topologies. FIG. 3 shows a block diagram of another DCDC converter 300 that might similarly experience inefficient operation under low load conditions. The DCDC converter 300 has a switch 304,305 including a P-channel FET 304 and an N-channel FET 305 configured to convert current at a first voltage level $V_{BATT}$ to another voltage form according to a PWM signal provided by a PWM module 301 via inverters 302,303. In some implementations, there is a filter 309 at the output for filtering the voltage form from the switch 304,305 in order to achieve a smoother analog output.

The DCDC converter 300 is similar to the DCDC converter 100 shown in FIG. 1 in that it also features the buck topology. Therefore, operation of the DCDC converter 300 is also similar to the operation of the DCDC converter 100 shown in FIG. 1. As such, details are not repeated here. However, it is noted that the DCDC converter 300 differs in that there is closed loop control. In particular, there is a pair of resistors 307,308 that provide resistive division of the output voltage thereby providing a feedback voltage $V_{fb}$, which is fed back to the PWM module 301 for comparison with a reference voltage $V_{ref}$. Further details of the closed loop control are provided below.

During the first stage, when the voltage at the analog output exceeds a level such that the feedback voltage $V_{fb}$ exceeds the reference voltage $V_{ref}$, the PWM module 301 turns off the P-channel FET 304 and turns on the N-channel FET 305 thereby transitioning to the second stage. Conversely, during the second stage, when the voltage at the analog output 106 output no longer exceeds the level, the PWM module 301 turns on the P-channel FET 304 and turns off the N-channel FET 109 thereby transitioning back to the first stage. The first and second stages repeat. During this switching operation, the switch 304,305 converts current at the first voltage level to another voltage form according to the reference voltage $V_{ref}$.

For example, if the reference voltage $V_{ref}$ is 1.1V and the battery input $V_{BATT}$ is 2.2V, then the PWM module 301 will drive the pair of transistors 304,305 with a signal having a duty cycle that will cause the pair of transistors 304,305 and the inductor 306 to provide an output voltage that after resistive division in the feedback results in the feedback voltage $V_{fb}$ being 1.1V thereby matching the reference voltage $V_{ref}$. If the duty cycle is 50%, the inductor 306 is connected to the battery input $V_{BATT}$ half of the time and to ground the other half of the time. The analog output might for example be around 1.5V.

According to the closed loop control shown in the illustrated example, the analog output can be controlled by either controlling a ratio between the pair of resistors 307,308 while keeping $V_{ref}$ constant (e.g. internally generate $V_{ref}$), or by keeping the pair of resistors 307,308 constant (e.g. internally implemented resistors) and varying $V_{ref}$. Regardless of how the analog output is controlled, it is noted that the DCDC converter 300 has the same issue of power inefficiency under low load conditions discussed above with reference to FIGS. 1-3.

One approach for improving efficiency for low load conditions is to turn on PFM. Dynamic switching losses can be reduced when using PFM by entering a low frequency mode of operation. Therefore, as will be shown in FIGS. 4A and 4B, efficiency can increase when using PFM.

Figure 4A:
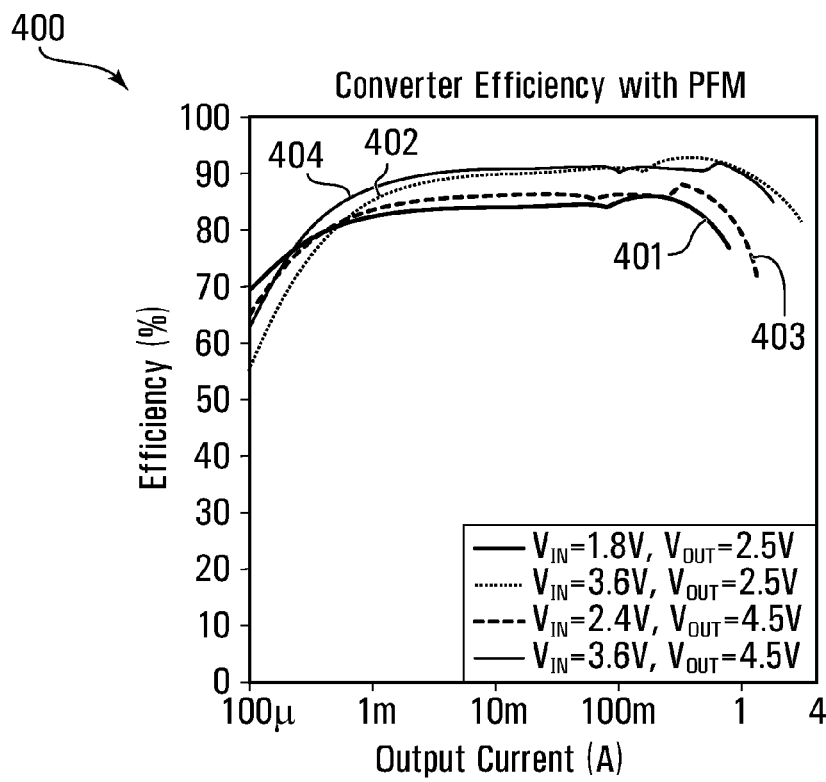
FIGS. 4A and 4B are graphs comparing efficiency of a DCDC converter with and without pulse frequency modulation (PFM)
Figure 4B:
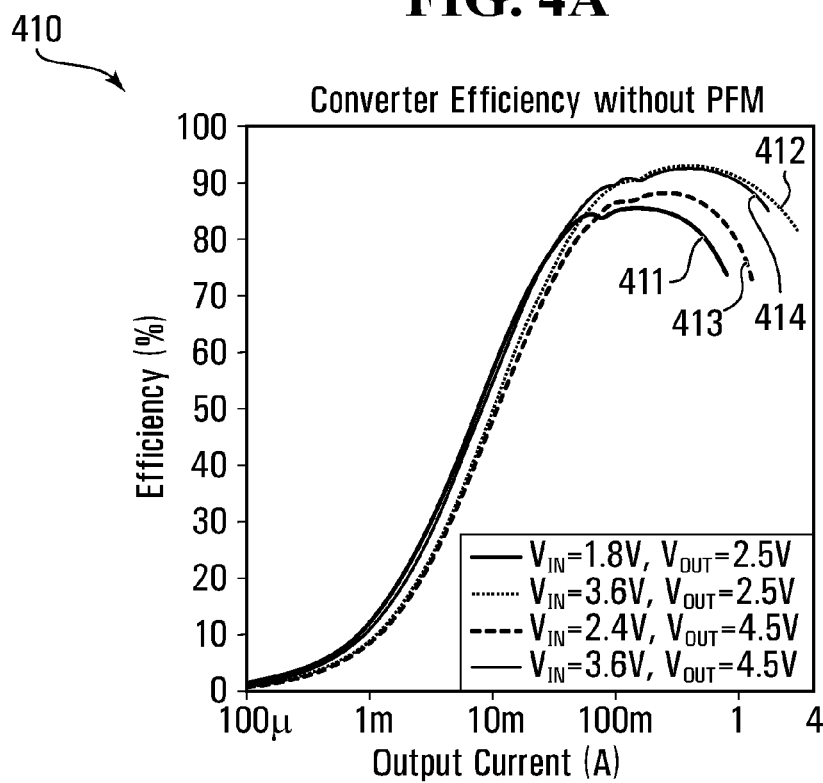

Referring now to FIGS. 4A and 4B, shown are graphs comparing efficiency of a DCDC converter with and without PFM. Note that these graphs are only examples and that other results might be possible depending on a number of conditions and factors.

Referring first to FIG. 4A, shown is a graph 300 showing efficiency of a DCDC converter using PFM. The graph includes four plots over output current: a first plot 401 for $V_{IN}$=1.8V and $V_{OUT}$=4.5V, a second plot 402 for $V_{IN}$=4.6V and $V_{OUT}$=4.5V, a third plot 403 for $V_{IN}$=2.4V and $V_{OUT}$=4.5V, and a fourth plot 404 for $V_{IN}$=3.6V and $V_{OUT}$=4.5V.

Referring now to FIG. 4B, shown is a graph 410 showing efficiency of the DCDC converter without using PFM. The graph includes four plots over output current: a first plot 411 for $V_{IN}$=1.8V and $V_{OUT}$=2.5V, a second plot 412 for $V_{IN}$=3.6V and $V_{OUT}$=2.5V, a third plot 413 for $V_{IN}$=2.4V and $V_{OUT}$=4.5V, and a fourth plot 414 for $V_{IN}$=3.6V and $V_{OUT}$=4.5V.

It can be seen from these graphs that the efficiency of the DCDC converter is greater when using PFM. Unfortunately, while efficiency improves, ripple current increases and spurious activity at the analog output is introduced. In some applications use of PFM is appropriate, as the spurious activity is tolerable. However, in other applications use of PFM might not be appropriate due to the spurious activity. Such applications might for example include various RF applications such as powering a voltage controlled oscillator, a phase locked loop, a power amplifier, a receiver, or a transmitter front-end. For such applications, the impact of the spurious activity caused by using PFM can be quite undesirable. In the PFM mode, spurious frequencies are produced over a wide spectral range unlike the PWM mode which only produces well defined ripples at fundamental and harmonics of the switching frequency. When this output is used to supply a PLL, the output of PLL translates the low frequency spurious to its output at RF frequency and violates the emission spectral mask requirements.

Another approach that might improve efficiency under low load conditions while avoiding the spurious activity seen when using PFM will be described in detail below with reference to FIGS. 5 through 11.

Another DCDC Converter

Figure 5:
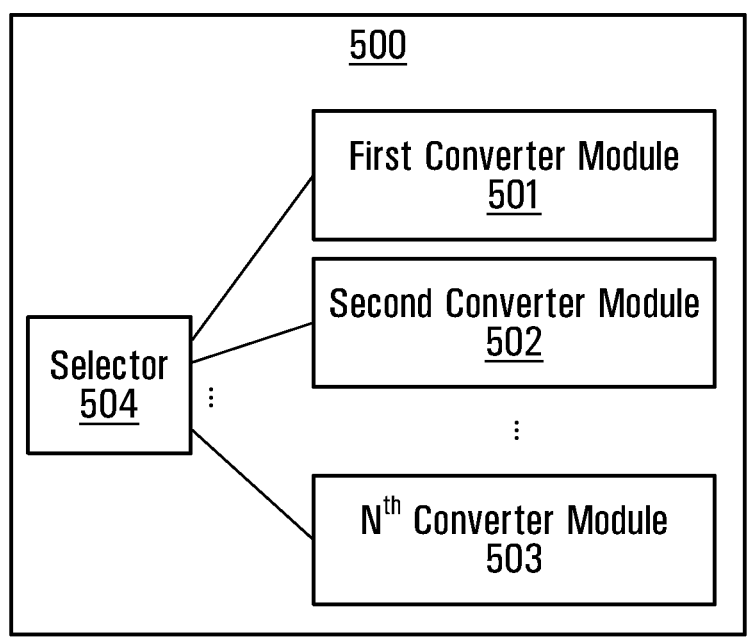
FIG. 5 is a block diagram of a DCDC converter featuring a plurality of converter modules.

Referring now to FIG. 5, shown is a block diagram of a DCDC converter 500 featuring a plurality of converter modules 501,502,503. Each converter module 501,502,503 is configured to convert current at a first voltage level to another voltage form. In some implementations, there is a filter (not shown) at the output for reducing ripple effects of PWM in order to achieve a smoother analog output.

In some implementations, each converter module 501,502, 503 has at least one switch configured to convert the current using PWM. The switch might for example be a pair of transistors as will be shown in subsequent examples. More generally, each converter module 501,502,503 has any appropriately configured switch used to convert the current using PWM.

Switching the switches on and off introduces internal power losses for example because of capacitances inherent with the switches. Under low load conditions when current draw from any circuits being powered by the DCDC converter 500 is relatively low, the DCDC converter 500 does not deliver much power but might still have substantially the same internal power losses from the switching. Therefore, inefficiencies can be relatively large if all of the switches are being switched on and off under low load conditions.

In accordance with an embodiment of the disclosure, the converter modules 501,502,503 are configured to be dynamically enabled or disabled such that only each converter module 501,502,503 that has been enabled converts current for an output of the DCDC converter 500. Any switches of the converter modules 501,502,503 that have been disabled do not get switched on and off.

Therefore, any inefficiency that would have been introduced by those switches are mitigated or eliminated altogether. The effect is that efficiency can be improved during low load conditions when there is no need to enable all of the converter modules 501,502,503.

In some implementations, as shown in the illustrated example, the

DCDC converter 500 has a selector 504. The selector is configured to dynamically enable or disable the converter modules 501,502,503 based on loading conditions. In the event that the DCDC converter 500 experiences low load conditions, then the selector 504 disables some of the converter modules 501,502,503. Conversely, in the event that the DCDC converter 500 experiences higher load conditions, then the selector 504 enables more of the converter modules 501,502,503. By dynamically enabling or disabling the converter modules 501,502,503 based on loading conditions, efficiency can be improved during low load conditions.

In alternative implementations, the converter modules 501, 502,503 are implemented in an apparatus without any selector being present. The apparatus might for example be an integrated circuit configured to receive enable signals in order to dynamically enable or disable the converter modules 501, 502,503. Other implementations are possible.

In some implementations, the dynamic enabling/disabling of the converter modules 501,502,503 modules means that the DCDC converter 500 as a whole need not perform the same way all of the time. This is because the converter modules 501,502,503 can be put into use or out of use, without (colloquially speaking) any actual re-wiring of the hardware. Instead, electrical control signals can bring a converter module into play or out of play and thereby change performance. In some implementations, this is performed dynamically based on loading conditions.

In some implementations, the converter modules 501,502, 503 are provided in parallel. This enables the converter modules 501,502,503 to be individually controllable with independent control. Further details of how converter modules might be individually controllable are provided below with reference to FIG. 6.

Figure 6:
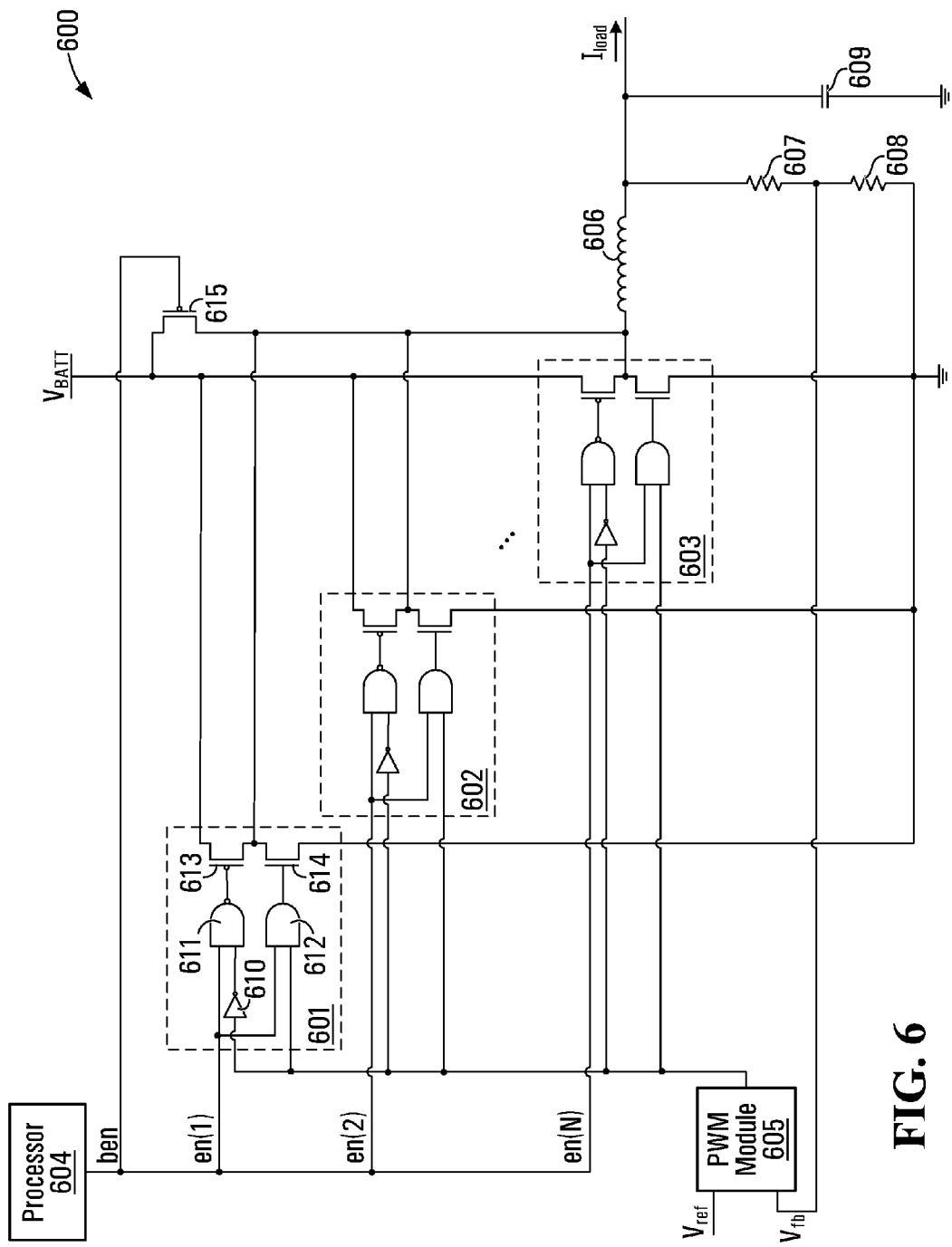
FIG. 6 is a block diagram of another DCDC converter featuring a plurality of converter modules.

Referring now to FIG. 6, shown is a block diagram of another DCDC converter 600 featuring a plurality of converter modules 601,602,603. Each converter module 601, 602,603 has a switch 613,614 configured to convert current at a first voltage level $V_{BATT}$ to another voltage form according to a PWM signal provided by a PWM module 605 using the energy stored in the inductor. In some implementations, there is a filter 606,609 at the output for reducing ripple effects of PWM in order to achieve a smoother analog output. In the illustrated example, the filter 606,609 includes an inductor 606 to smooth current passing through it, and a capacitor 609 for reducing ripple content in voltage caused by PWM. More generally, any appropriately configured filter can be implemented.

In the illustrated example, the switch 613,614 includes a P-channel FET 613 configured to periodically connect the first voltage level $V_{BATT}$ to the filter 606,609 according to the PWM signal. The switch 613,614 also includes an N-channel FET configured to connect a ground voltage to the filter 606,609 whenever the P-channel FET 613 has not connected the first voltage level $V_{BATT}$ to the filter 606,609. Other switches are possible. More generally, any appropriately configured switch can be implemented for converting current at the first voltage level $V_{BATT}$ to another voltage form.

Switching the transistors 613,614 on and off introduces internal power losses for example because of capacitances inherent with the transistors 613,614. Under low load conditions when current draw from any circuits being powered by the DCDC converter 600 is relatively low, the DCDC converter 600 does not deliver much power but might still have substantially the same internal power losses from the switching. Therefore, inefficiencies can be relatively large if all of the transistors 613,614 are being switched on and off under low load conditions.

In accordance with an embodiment of the disclosure, each converter module 601,602,603 has logic circuitry 610,611, 612 configured to provide the PWM signal to its switch 613, 614 only if the converter module 601,602,603 has been enabled. The transistors 613,614 of the converter modules 601,602,603 that have been disabled are off. Therefore, any inefficiency that would have been introduced by those transistors 613,614 are mitigated or eliminated altogether. The effect is that efficiency can be improved during low load conditions when there is no need to enable all of the converter modules 601,602,603.

In some implementations, the switches 613,614 and the logic circuitry 610,611,612 are distributed to form a bus. Each converter module 601,602,603 is individually controllable with an independent control line that is controlled digitally. To this end, each converter module 601,602,603 receives a respective enable signal en(1),en(2),en(N) from a processor 604 for selectively enabling or disabling the converter module 601,602,603.

In some implementations, as shown in the illustrated example, each converter module 601,602,603 includes an inverter 610 and a NAND gate 611 configured to drive the P-channel FET 613 with the PWM signal only if the enable signal en(1),en(2),en(N) for the converter module 601,602, 603 has been set to high; otherwise, the P-channel FET 613 is off. In some implementations, as shown in the illustrated example, each converter module 601,602,603 includes an AND gate 612 configured to drive the N-channel FET 614 with the PWM signal only if the enable signal en(1),en(2),en(N) for the converter module 601,602,603 has been set to high; otherwise, the N-channel FET 614 is off.

By way of example, if the processor 604 is to enable the first converter module 601, then the processor 604 sets the enable signal en(1) for the first converter module 601 to high. The effect is that the output of the NAND gate 611 is equal to the PWM signal and therefore the P-channel FET 613 is driven by the PWM signal. Furthermore, the output of the AND gate 612 is also equal to the PWM signal and therefore the N-channel FET 614 is driven by the PWM signal. Therefore, the switch 613,614 is driven by the PWM signal when the first converter module 601 has been enabled.

Conversely, if the processor 604 is to disable the first converter module 601, then the processor 604 sets the enable signal en(1) to low. The effect is that the output of the NAND gate 611 is high and therefore the P-channel FET 613 is turned off. Furthermore, the output of the AND gate 612 is low and therefore the N-channel FET 614 is turned off. Therefore, the switch 613,614 is turned off and is not driven by the PWM signal when the first converter module 601 has been disabled.

It is to be understood that there are alternative possibilities for the logic circuitry 610,611,612. Any suitable logic circuitry that drives the switch 613,614 with the PWM signal only when the converter module 601,602,603 has been enabled can be implemented. Note that this might not necessarily involve the inverter 610, the NAND gate 611, and the AND gate 612. In alternative implementations, each converter module 601,602,603 receives two separate enable signals: a first enable signal for enabling the P-channel FET 613, and a second enable signal for enabling the N-Channel FET 614. For example, the two separate enable signals can be directly generated inside the PWM module 605 for each converter module 601,602,603 using other gates. Other implementations are possible that provide the same functionality of turning the P-channel FET 613 on while the N-channel FET 614 is off, and P-channel FET 613 off while the N-channel FET 614 is turned on, and providing an enable signal that enables this operation. When the enable is turned off, both devices are turned off.

The processor 604 is configured to dynamically enable or disable the converter modules 601,602,603 based on loading conditions. In the event that the DCDC converter 600 experiences low load conditions, then the processor 604 disables some of the converter modules 601,602,603. Conversely, in the event that the DCDC converter 600 experiences higher load conditions, then the processor 604 enables more of the converter modules 601,602,603. By dynamically enabling or disabling the converter modules 601,602,603 based on loading conditions, efficiency can be improved during low load conditions. In many cases, the processor 604 can be provided with knowledge to increase the output. For example, if the DCDC converter 600 is implemented in a wireless handset and the processor 604 is to turn on more load or a DSP processor sends a request to a transceiver to increase output power, then such information can be provided to the processor 604 to control the converter modules 601,602,603 accordingly.

In some implementations, the processor 604 is configured to implement the dynamic selection of converter modules 601,602,603 according to software operating on the processor 604. For such implementations, the DCDC converter 600 is implemented in an apparatus having the processor 604 and a memory (not shown) having stored thereon computer-executable instructions that when executed on the processor 604 implement a method for performing the dynamic selection. Further details of the method for performing the dynamic selection are provided below with reference to FIG. 10.

In alternative implementations, software is not utilised to implement the dynamic selection of converter modules 601, 602,603. Instead, the dynamic selection of converter modules 601,602,603 is implemented with only hardware and/or firmware. For example, control can be exerted by an on chip processing element (e.g. a state machine or other simple processor). More generally, the dynamic selection of converter modules 601,602,603 can be implemented using software, firmware, hardware, or any appropriate combination thereof.

In other alternative implementations, the dynamic selection of converter modules 601,602,603 is implemented by an external component. For example, the DCDC converter 600 might be implemented in an integrated circuit having an interface for receiving the dynamic selection via external control. The interface might for example be a serial interface or other interface. More generally, the dynamic selection of converter modules 601,602,603 can be implemented with the DCDC converter 600 or externally.

Each converter module 601,602,603 that has been enabled converts current at the first voltage level $V_{BATT}$ to another voltage form, which is then filtered by the filter 606,609 in order to generate a filtered output voltage as similarly described with reference to FIG. 1. Therefore, the current $I_{load}$ provided to any circuits being powered by the DCDC converter 600 is provided at the filtered output voltage. The magnitude of the filtered output voltage is determined based on a duty cycle of the PWM signal. In some implementations, as shown in the illustrated example, the duty cycle of the PWM signal is determined based on a reference voltage $V_{ref}$ provided to the PWM module 605.

In some implementations, as shown in the illustrated example, the DCDC converter 600 has a feedback loop so that the duty cycle of the PWM signal can be adjusted in order to hold the filtered output voltage at the output. The feedback voltage $V_{fb}$ is equal to the filtered output voltage multiplied by a ratio of a pair of resistors 607,608. If the feedback voltage $V_{fb}$ is less than the reference voltage $V_{ref}$, then the PWM module 605 increases the duty cycle. Conversely, if the feedback voltage $V_{fb}$ is greater than the reference voltage $V_{ref}$, then the PWM module 605 decreases the duty cycle.

In some implementations, the filtered output voltage can be controlled by controlling the ratio of the pair of resistors 607,608 while keeping $V_{ref}$ constant (e.g. internally generate $V_{ref}$). Alternatively, the filtered output voltage can be controlled by keeping the pair of resistors 607,608 constant (e.g. internally implemented resistors) and varying $V_{ref}$.

In some implementations, as shown in the illustrated example, the DCDC converter 600 includes a power transistor 615 configured to supply the first voltage level $V_{BATT}$ to the filter 606,609 at the output in response to a bypass enable signal ben provided by the processor 604. Note that the power transistor 615 is not a converter module because it does not convert current from the first voltage level $V_{BATT}$ to another voltage form. The power transistor 615 can be used to bypass the converter modules 601,602,603 when it is desired to supply current at the first voltage level $V_{BATT}$ while avoiding any inefficiencies introduced by the converter modules 601,602, 603 and while enabling open loop control. Alternatively, the power transistor 615 can be used to supplement current provided by the converter modules 601,602,603.

In some implementations, when highest output power is desired, the power transistor 615 is turned on. As output power drops slightly, the power transistor 615 can be turned off while all converter modules 601,602,603 are enabled by setting all of the enable signals en(1),en(2),en(N) to high. As demand for output power further decreases, some of the enable signals en(1),en(2),en(N) can be set to low in order to disable some of the converter modules 601,602,603 in order to reduce conduction and driver losses thereby improving efficiency.

Whilst the DCDC converter 600 uses PWM, it is to be understood that this does not preclude use of PFM for any drive condition. PFM implementations are possible and are within the scope of the disclosure. Furthermore, whilst the DCDC converter 600 focuses on using one power phase, it is to be understood that this does not preclude use of multiple power phases. Using multiple power phases can help to reduce ripples on the output. Multiple power phase implementations are possible and are within the scope of the disclosure.

Figure 7:
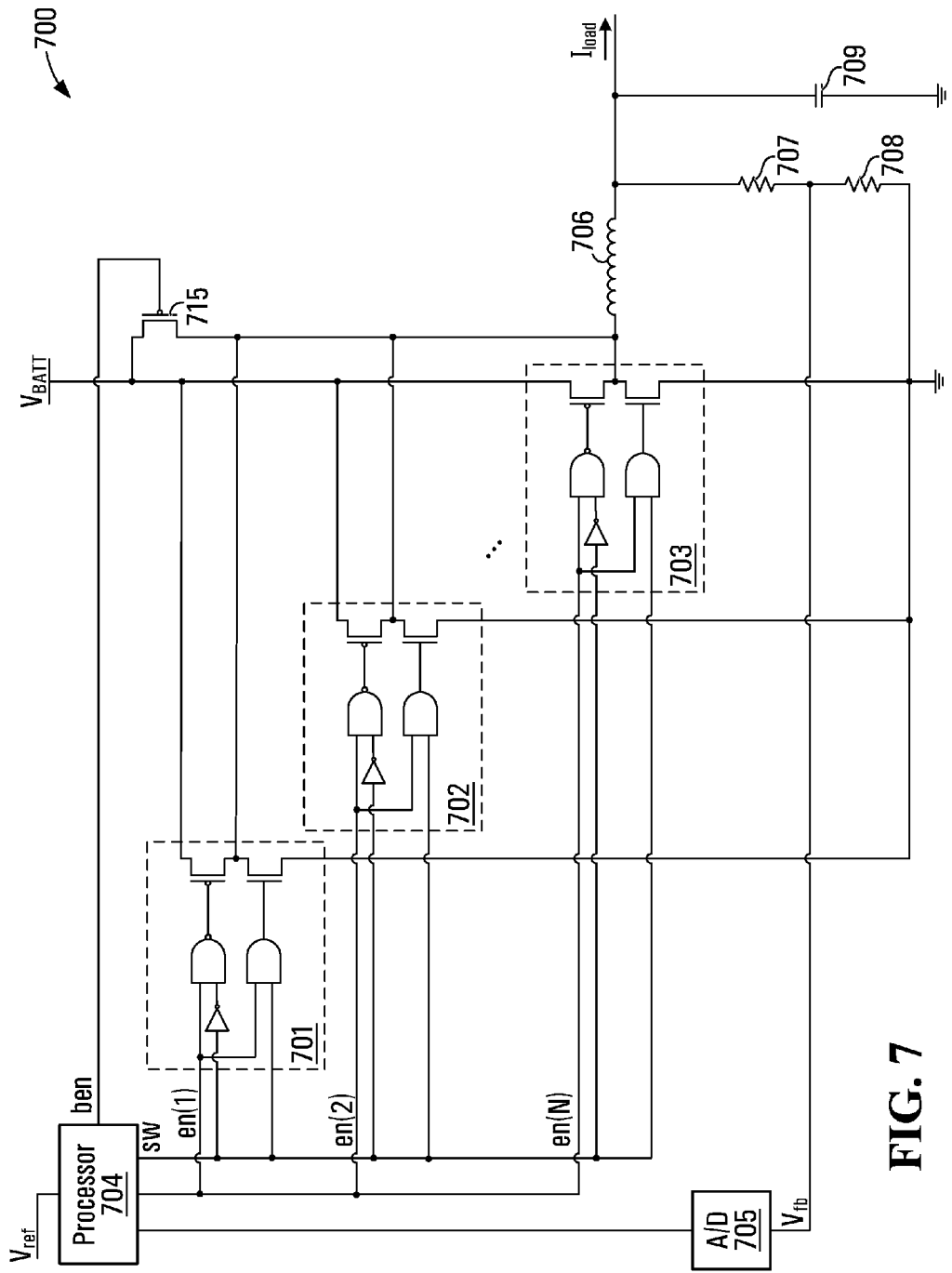
FIG. 7 is a block diagram of another DCDC converter featuring a plurality of converter modules.

Referring now to FIG. 7, shown is a block diagram of another DCDC converter 700 featuring a plurality of converter modules 701,702,703. The DCDC converter 700 also has a filter 706,709 for filtering ripples caused by PWM, a pair of resistors 707,708 for a feedback loop, and a power transistor 715 supplying current at the first voltage level $V_{BATT}$. The converter modules 701,702,703, the filter 706,709, the resistors 707,708, and the power transistor 715 substantially correspond to components already described above with reference to FIG. 6 and therefore details are not repeated here.

The processor 704 dynamically enables or disables the converter modules 701,702,703 as similarly described above with reference to FIG. 6. However, in contrast with the processor 604 described above with reference to FIG. 6, the processor 704 also generates the PWM signal sw based on a reference voltage $V_{ref}$. Therefore, the DCDC converter 700 does not use a separate PWM module. Furthermore, if the reference voltage $V_{ref}$ is digitized, then there is no need for an external digital to analog converter to provide the reference voltage $V_{ref}$ to a PWM module.

In some implementations, as shown in the illustrated example, the DCDC converter 700 also has a feedback loop so that the duty cycle of the PWM signal can be adjusted in order to hold a voltage level at the output. However, in contrast with the DCDC converter 600 shown in FIG. 6, the feedback loop goes back to the processor 704. In the illustrated example the processor 704 is a digital processor and therefore there is provided an analog to digital converter 705 configured to convert the feedback voltage $V_{fb}$ into digital form.

Figure 8:
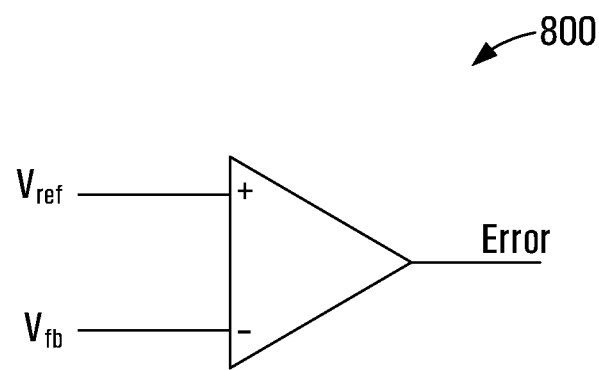
FIG. 8 is a block diagram of a comparator for generating an error signal.

In alternative implementations, a comparator can be used to compare the reference voltage $V_{ref}$ with the feedback voltage $V_{fb}$ in order to generate an error signal when the feedback voltage $V_{fb}$ drops below the reference voltage $V_{ref}$. FIG. 8 depicts such a comparator 800 in which a single bit digitized error signal can be generated for a processor/controller. Such error signal could be provided to the processor 704 shown in FIG. 7 so that the processor 704 can adjust the duty signal of the PWM signal according to the error signal.

Multiple DCDC Converters

Figure 9:
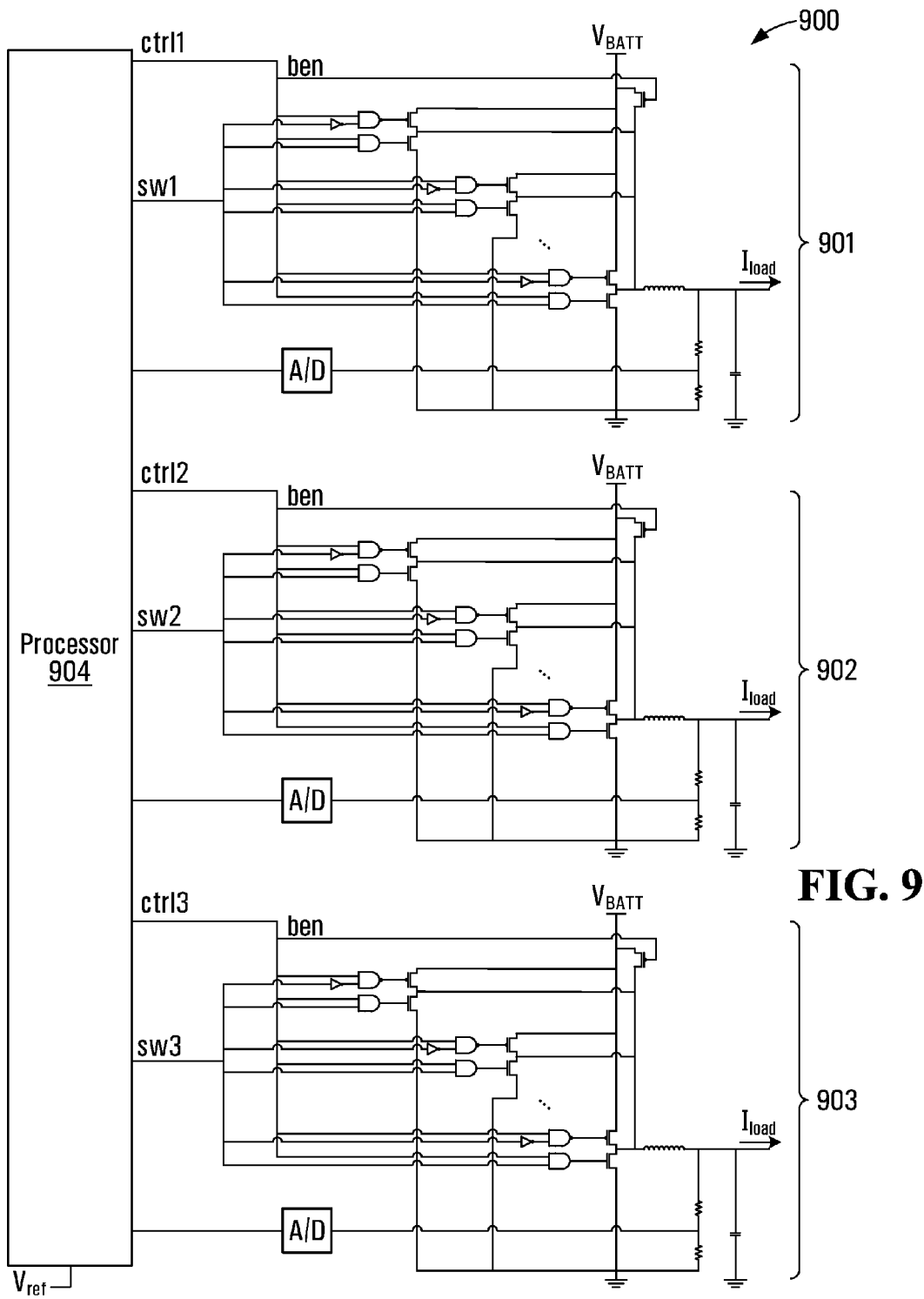
FIG. 9 is a block diagram of an apparatus having multiple DCDC converters.

Referring now to FIG. 9, shown is a block diagram of an apparatus 900 having multiple DCDC converters 901,902, 903. Multiple DCDC converters 901,902,903 can be implemented for example when it is desired to have multiple different voltage levels for powering different circuits. The DCDC converters 901,902,903 are substantially identical to the DCDC converter 700 shown in FIG. 7 and therefore details are not repeated here.

The DCDC converters 901,902,903 are controlled by a single programmable controller, namely a processor 904. The processor 904 processes multiple feedback signals through multiple analog to digital converters and generates the PWM signal sw as well as the enable signals en(1),en(2),en(N) as similarly described in the previous examples.

In the illustrated example, there are multiple analog to digital converters (i.e. one analog to digital converter per DCDC converters 901,902,903). In alternative implementations, a single multi-channel analog to digital converter is used. All of the feedback signals can be converted using the single multi-channel analog to digital converter. This can potentially reduce hardware cost.

In the illustrated example, each DCDC converter 901,902, 903 is shown to have a closed loop. However, closed loop regulation can be converted to open loop regulation when loads are expected to stay static. Hence, the analog to digital conversion can be duty cycled to reduce power under light load/stand-by conditions.

Method of Dynamic Selection

Figure 10:
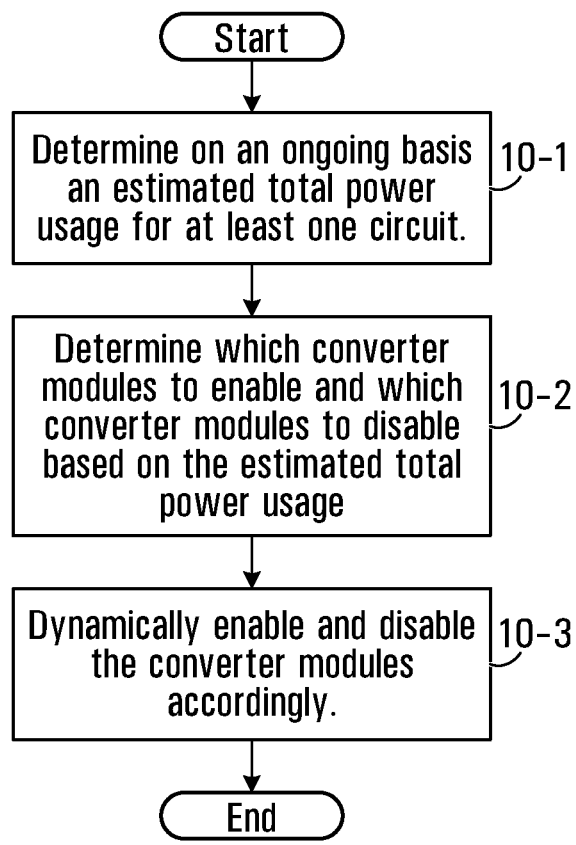
FIG. 10 is a flowchart of a method for performing dynamic selection of converter modules.

Referring now to FIG. 10, shown is a flowchart of a method for performing dynamic selection of converter modules. This method can be implemented by an apparatus, for example by the selector 504 of the DCDC converter 500 shown in FIG. 5, the processor 604 of the DCDC converter 600 shown in FIG. 6, the processor 704 of the DCDC converter 700 shown in FIG. 7, or the processor 904 of the apparatus 900 shown in FIG. 9. More generally, this method can be implemented by any appropriately configured apparatus comprising a DCDC converter having a plurality of converter modules each configured to convert current from a first voltage level to another level.

At step 10-1, the apparatus determines on an ongoing basis an estimated total power usage for at least one circuit being powered by the DCDC converter. At step 10-2, the apparatus determines which converter modules to enable and which converter modules to disable based on the estimated total power usage. Finally, at step 10-3, the apparatus dynamically enables or disables the converter modules accordingly.

There are many ways that the apparatus can determine the estimated power usage. In some implementations, the apparatus maintains a look-up table that identifies, for each circuit, power usage as a function of operation of the circuit. For each circuit, the apparatus determines an operating state and a resulting power usage according to the look-up table. Therefore, the apparatus can determine the estimated total power usage as a sum of all resulting power usages determined from the look-up table.

By way of example, if the at least one circuit being powered by the DCDC converter includes a wireless access radio, then the look-up table might identify a first power usage for when the wireless access radio is idle and a second power usage for when the wireless access radio is actively transmitting/receiving. The apparatus determines whether the wireless access radio is idle or is actively transmitting/receiving, and then determines a resulting power usage according to the look-up table. If there are other circuits being powered by the DCDC converter, then the apparatus determines for each circuit an operating state and a resulting power usage according to the look-up table. Finally, the apparatus determines the estimated total power usage as a sum of all resulting power usages determined from the look-up table.

There are many ways that the apparatus can determine which converter modules to enable and which converter modules to disable. In some implementations, the apparatus determines a minimum number of converter modules that should be enabled in order to handle the estimated total power usage. Therefore, the apparatus can determine which converter modules to enable and which converter modules to disable in accordance with the minimum number of converter modules that should be enabled.

By way of example, if each converter module is capable of supplying 500 mW of power and the estimated total power usage is 3.3 W, then at least seven converter modules should be enabled. If five converter modules are already enabled, then the apparatus might enable another two converter modules so that a total of seven converter modules are enabled. If ten converter modules are already enabled, then the apparatus might disable three of these converter modules so that a total of seven converter modules are enabled. If each converter module is identical, then the selection is arbitrary.

In alternative implementations, the converter modules are not identical and therefore the apparatus takes this into account when determining which converter modules to enable and which converter modules to disable. By way of example, the converter modules might include a mix of different converter modules capable of supplying 500 mW, 1000 mW, or 3000 mW of power. If the estimated total power usage is 3.3 W, then the apparatus might enable one of the converter modules capable of supplying 3000 mW of power and one of the converter modules capable of supplying 500 mW. Note that this might be more efficient than enabling two of the converter modules capable of supplying 3000 mW of power. The converter modules capable of supplying more power might have larger switches and therefore more internal power losses for example because of capacitances inherent with the switches.

Computer Readable Medium

In accordance with another embodiment of the disclosure, there is provided a non-transitory computer readable medium having computer executable instructions stored thereon for execution on a processor of an apparatus so as to implement the method described above. The non-transitory computer readable medium might for example be an optical disk such as a Compact Disk (CD), a Digital Video Disk (DVD), or a Blu-Ray Disk (BD). Alternatively, the non-transitory computer readable medium might for example be a memory stick, a memory card, a disk drive, a solid state drive, etc. Other non-transitory computer readable media are possible and are within the scope of this disclosure. More generally, the non-transitory computer readable medium can be any tangible medium in which the computer executable instructions can be stored.

Mobile Device

Figure 11:
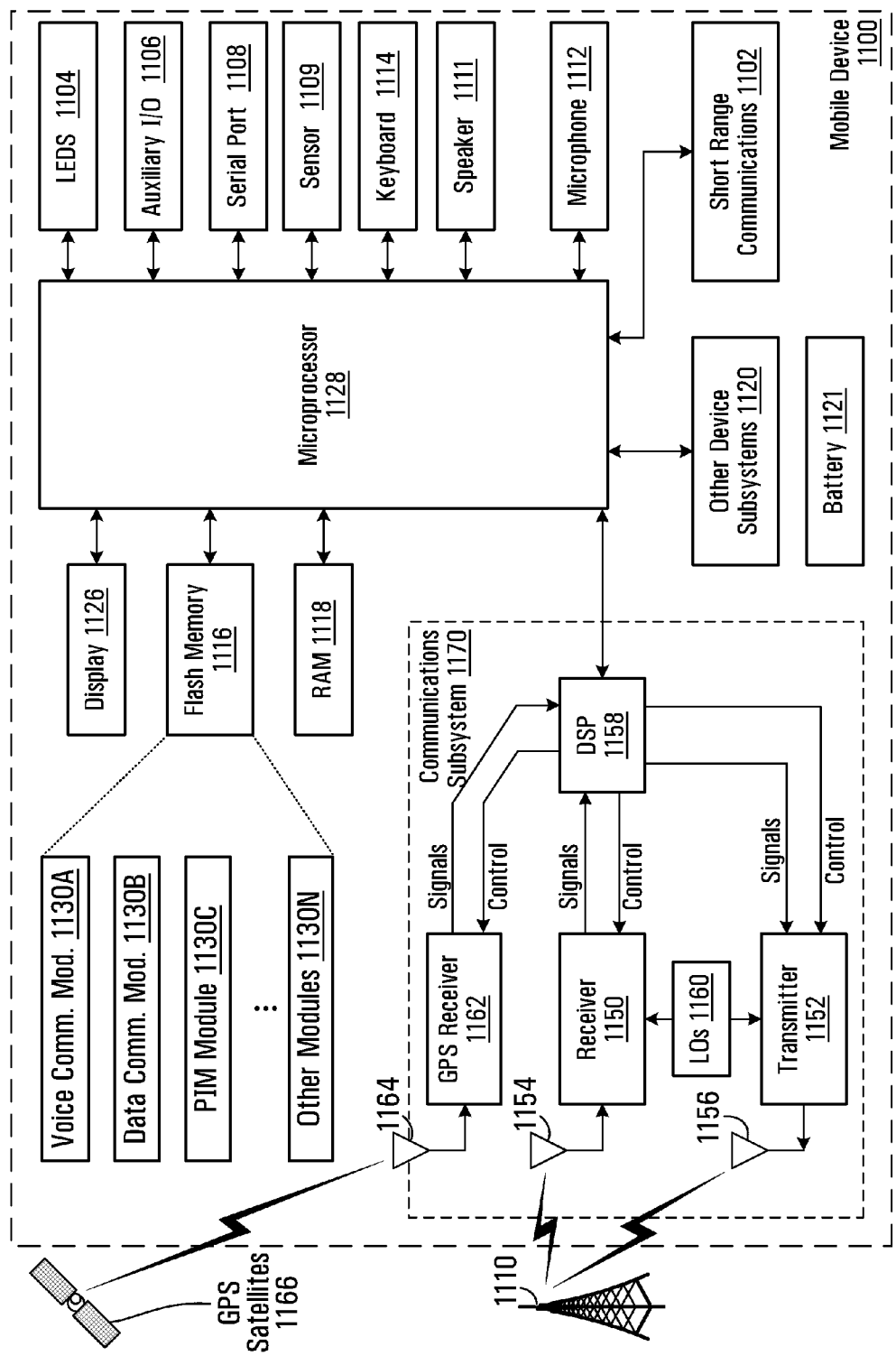
FIG. 11 is a block diagram of a mobile device.

Referring now to FIG. 11, shown is a block diagram of a mobile device 1100. This mobile device 1100 is presented as an example apparatus that might implement a DCDC converter with converter modules that can be dynamically enabled or disabled based on loading condition of various circuits within mobile device 1100.

The mobile device 1100 has a many circuits as will be described in further detail below. Some or all of these circuits can be powered using the DCDC converter 500 shown in FIG. 5, the DCDC converter 600 shown in FIG. 6, or the DCDC converter 700 shown in FIG. 7. In some implementations, multiple DCDC converters are used in order to power the circuits as similarly described above with reference to FIG. 9. In some implementations, one or more DCDC converters can work in concert with or supplant other power-management systems or techniques, etc.

It is to be understood that the mobile device 1100 is shown with very specific details and is provided only as an example. Other mobile devices are possible and are within the scope of this disclosure. Furthermore, other apparatuses (e.g. desktop computer, tablet computer, etc.) are possible, whether mobile or not, and are within the scope of this disclosure. In other words, embodiments of the disclosure are applicable to a variety of devices and uses, including devices that are not mobile devices.

The mobile device 1100 has a housing that may be elongated vertically, or may take on other sizes and shapes (including clamshell housing structures). The keyboard 1114 may include a mode selection key, or other hardware or software for switching between text entry and telephony entry. Alternatively, the mobile device 1100 may have a housing that does not take on other sizes and shapes.

Size and weight of any DCDC converters in the mobile device 1100 can be important design considerations. In some implementations, each DCDC converter is made to be small and lightweight, which can be advantageous for handheld devices such as the mobile device 1100 which is sized and shaped to be held or carried in a human hand. Note that for alternative non-mobile embodiments, size and weight of any DCDC converters might be of lesser importance.

A microprocessor 1128 is shown schematically as coupled between a keyboard 1114 and a display 1126. The microprocessor 1128 is a type of processor. The microprocessor 1128 controls operation of the display 1126, as well as overall operation of the mobile device 1100, in response to actuation of keys on the keyboard 1114 by a user.

In addition to the microprocessor 1128, other parts of the mobile device 1100 are shown schematically. These include: a communications subsystem 1170; a short-range communications subsystem 1102; the keyboard 1114 and the display 1126, along with other input/output devices including a set of LEDs 1104, a set of auxiliary I/O devices 1106, a serial port 1108, a speaker 1111 and a microphone 1112; as well as memory devices including a flash memory 1116 and a Random Access Memory (RAM) 1118; and various other device subsystems 1120. The mobile device 1100 may have a battery 1121 to power the active elements of the mobile device 1100. The mobile device 1100 is in some embodiments a two-way radio frequency (RF) communication device having voice and data communication capabilities. In addition, the mobile device 1100 in some embodiments has the capability to communicate with other computer systems via the Internet.

Operating system software executed by the microprocessor 1128 is in some embodiments stored in a persistent store, such as the flash memory 1116, but may be stored in other types of memory devices, such as a read only memory (ROM) or similar storage element. In addition, system software, specific device applications, or parts thereof, may be temporarily loaded into a volatile store, such as the RAM 1118. Communication signals received by the mobile device 1100 may also be stored to the RAM 1118.

The microprocessor 1128, in addition to its operating system functions, enables execution of software applications on the mobile device 1100. A predetermined set of software applications that control basic device operations, such as a voice communications module 1130A and a data communications module 1130B, may be installed on the mobile device 1100 during manufacture. In addition, a personal information manager (PIM) application module 1130C may also be installed on the mobile device 1100 during manufacture. The PIM application is in some embodiments capable of organizing and managing data items, such as e-mail, calendar events, voice mails, appointments, and task items. The PIM application is also in some embodiments capable of sending and receiving data items via a wireless network 1110. In some embodiments, the data items managed by the PIM application are seamlessly integrated, synchronized and updated via the wireless network 1110 with the device users corresponding data items stored or associated with a host computer system. Additional software modules, illustrated as another software module 1130N, may be installed during manufacture.

Communication functions, including data and voice communications, are performed through the communication subsystem 1170, and possibly through the short-range communications subsystem 1102. The communication subsystem 1170 includes a receiver 1150, a transmitter 1152, a GPS receiver 1162, and one or more antennas, illustrated as a receive antenna 1154, a transmit antenna 1156, and a GPS antenna 1164. In addition, the communication subsystem 1170 also includes a processing module, such as a digital signal processor (DSP) 1158, and local oscillators (LOs) 1160.

The specific design and implementation of the communication subsystem 1170 might be dependent upon the communication network in which the mobile device 1100 is intended to operate. The communication network might be a cellular network. For example, the communication subsystem 1170 of the mobile device 1100 may be designed to operate with the Mobitex™, DataTAC™ or General Packet Radio Service (GPRS) mobile data communication networks and also designed to operate with any of a variety of voice communication networks, such as Advanced Mobile Phone Service (AMPS), Time Division Multiple Access (TDMA), Code Division Multiple Access (CDMA), Personal Communications Service (PCS), Global System for Mobile Communications (GSM), etc. Examples of CDMA include 1X and 1x EV-DO, and Wideband CDMA. Other applicable communication networks might include packet data systems, Enhanced Data rates for GSM Evolution (EDGE), E-EDGE, UMTS/UTRAN, OFDMA systems, TD-SCDMA systems, LTE/E-UTRAN, etc. The communication subsystem 1170 may also be designed to operate with a non-cellular network such as an 802.11 Wi-Fi network or an 802.16 WiMAX network or both. Other types of data and voice networks, both separate and integrated, may also be utilized with the mobile device 1100.

Network access may vary depending upon the type of communication system. For example, in the Mobitex™ and DataTAC™ networks, mobile devices are registered on the network using a unique Personal Identification Number (PIN) associated with each device. In GPRS networks, however, network access is typically associated with a subscriber or user of a device. A GPRS device therefore typically has a subscriber identity module, commonly referred to as a Subscriber Identity Module (SIM) card, in order to operate on a GPRS network.

When network registration or activation procedures have been completed, the mobile device 1100 may send and receive communication signals over the communication network 1110. Signals received from the communication network 1110 by the receive antenna 1154 are routed to the receiver 1150, which provides for signal amplification, frequency down conversion, filtering, channel selection, etc., and may also provide analog to digital conversion. Analog-to-digital conversion of the received signal allows the DSP 1158 to perform more complex communication functions, such as demodulation and decoding. In a similar manner, signals to be transmitted to the network 1110 are processed (e.g., modulated and encoded) by the DSP 1158 and are then provided to the transmitter 1152 for digital to analog conversion, frequency up conversion, filtering, amplification and transmission to the communication network 1110 (or networks) via the transmit antenna 1156.

In addition to processing communication signals, the DSP 1158 provides for control of the receiver 1150, the transmitter 1152, and the GPS receiver 1162. For example, gains applied to communication signals in the receiver 1150 and the transmitter 1152 may be adaptively controlled through automatic gain control algorithms implemented in the DSP 1158.

In a data communication mode, a received signal, such as a text message or web page download, is processed by the communication subsystem 1170 and is input to the microprocessor 1128. The received signal is then further processed by the microprocessor 1128 for an output to the display 1126, or alternatively to some other auxiliary I/O devices 1106. A device user may also compose data items, such as e-mail messages, using the keyboard 1114 or some other auxiliary I/O device 1106, such as a touchpad, a rocker switch, a thumb-wheel, or some other type of input device, or combinations thereof. The composed data items may then be transmitted over the communication network 1110 via the communication subsystem 1170.

In a voice communication mode, overall operation of the device is substantially similar to the data communication mode, except that received signals are output to a speaker 1111, and signals for transmission are generated by a microphone 1112. Alternative voice or audio I/O subsystems, such as a voice message recording subsystem, may also be implemented on the mobile device 1100. In addition, the display 1126 may also be utilized in voice communication mode, for example, to display the identity of a calling party, the duration of a voice call, or other voice call related information.

Location determination using GPS technology involves receiving GPS signals from GPS satellites 1166 on the antenna 1164. The GPS signals are received using the GPS receiver 1162 and processed by the DSP 1158. Typically, GPS signals from at least four satellites are processed. Further details of GPS are omitted for simplicity.

The short-range communications subsystem 1102 enables communication between the mobile device 1100 and other proximate systems or devices, which need not necessarily be similar devices. For example, the short range communications subsystem may include an infrared device and associated circuits and components, or a Bluetooth™ communication module to provide for communication with similarly-enabled systems and devices.

Numerous modifications and variations of the present disclosure are possible in light of the above teachings. It is therefore to be understood that within the scope of the appended claims, the disclosure may be practised otherwise than as specifically described herein.

I claim:

1. An apparatus comprising:
    a Direct Current to Direct Current 'DCDC' converter having a plurality of converter modules each configured to convert current at a first voltage level to another voltage form;
    wherein the converter modules are configured to be dynamically enabled or disabled such that only each converter module that has been enabled converts current for an output of the DCDC converter;
    wherein each converter module comprises a switch configured to periodically supply the first voltage level to a filter at the output of the DCDC converter according to a Pulse Width Modulation 'PWM' signal, and logic circuitry configured to provide the PWM signal to the switch only if the converter module has been enabled;
    wherein for each converter module:
        the switch comprises a P-channel Field Effect Transistor 'FET' configured to connect the first voltage level to the filter, and an N-channel FET configured to connect a ground voltage level to the filter; and
        the logic circuitry comprises first logic configured to drive the P-channel FET with the PWM signal only if the converter module has been enabled, and second logic configured to drive the N-channel FET with the PWM signal only if the converter module has been enabled;

wherein each converter module receives a respective enable signal for selectively enabling or disabling the converter module, wherein for each converter module:

the first logic is configured to drive the P-channel FET according to a logic NAND operation of the enable signal and an inversion of the PWM signal; and the second logic is configured to drive the N-channel FET according to a logic AND operation of the enable signal and the PWM signal.

2. The apparatus of claim 1, further comprising:
a selector configured to dynamically enable or disable the converter modules based on loading conditions of at least one circuit being powered by the DCDC converter.

3. The apparatus of claim 2, wherein the selector is configured to dynamically enable or disable the converter modules by enabling converter modules as load increases and disabling converter modules as load decreases.

4. The apparatus of claim 3, wherein the selector is configured for:
determining on an ongoing basis an estimated total power usage for the at least one circuit being powered by the DCDC converter;
determining which converter module(s) to enable and which converter module(s) to disable based on the estimated total power usage; and
dynamically enabling or disabling the converter modules accordingly.

5. The apparatus of claim 2, further comprising:
a processor; and
a memory having stored thereon computer-executable instructions that when executed on the processor implement the selector.

6. The apparatus of claim 2, wherein the apparatus is a mobile device comprising:
a battery configured to provide the current at the first voltage level; and
the at least one circuit configured to receive power from the DCDC converter.

7. The apparatus of claim 6, wherein the mobile device is a wireless device comprising:
a wireless access radio configured to communicate with wireless networks;
wherein the at least one circuit configured to receive power from the DCDC converter comprises the wireless access radio.

8. An apparatus comprising:
a Direct Current to Direct Current 'DCDC' converter having a plurality of converter modules each configured to convert current at a first voltage level to another voltage form;
wherein the converter modules are configured to be dynamically enabled or disabled such that only each converter module that has been enabled converts current for an output of the DCDC converter;
wherein the apparatus further comprises a selector configured to dynamically enable or disable the converter modules based on loading conditions of at least one circuit being powered by the DCDC converter;
wherein the selector is configured to dynamically enable or disable the converter modules by enabling converter modules as load increases and disabling converter modules as load decreases;

wherein the selector is configured for determining on an ongoing basis an estimated total power usage for the at least one circuit being powered by the DCDC converter, determining which converter module(s) to enable and which converter module(s) to disable based on the estimated total power usage, and dynamically enabling or disabling the converter modules accordingly;

wherein the selector is configured for determining the estimated total power usage by:
maintaining a look-up table identifying, for each of the at least one circuit, power usage as a function of operation of the circuit;
for each of the at least one circuit, determining an operating state and a resulting power usage according to the look-up table; and
determining the estimated total power usage as a sum of all resulting power usages determined using the look-up table.

9. The apparatus of claim 8, wherein the selector is configured for determining which converter module(s) to enable and which converter module(s) to disable by:
determining a minimum number of converter modules that should be enabled in order to handle the estimated total power usage; and
determining which converter module(s) to enable and which converter module(s) to disable in accordance with the minimum number of converter modules that should be enabled.

10. The apparatus of claim 8, further comprising:
a processor; and
a memory having stored thereon computer-executable instructions that when executed on the processor implement the selector.

11. The apparatus of claim 8, wherein the apparatus is a mobile device comprising:
a battery configured to provide the current at the first voltage level; and
the at least one circuit configured to receive power from the DCDC converter.

12. The apparatus of claim 11, wherein the mobile device is a wireless device comprising:
a wireless access radio configured to communicate with wireless networks;
wherein the at least one circuit configured to receive power from the DCDC converter comprises the wireless access radio.

13. A method for execution in an apparatus comprising a Direct Current to Direct Current 'DCDC' converter having a plurality of converter modules each configured to convert current at a first voltage level to another voltage form, the method comprising:
determining on an ongoing basis an estimated total power usage for at least one circuit being powered by the DCDC converter;
determining which converter module(s) to enable and which converter module(s) to disable based on the estimated total power usage; and
dynamically enabling or disabling the converter modules accordingly;
wherein determining the estimated power usage comprises:
maintaining a look-up table identifying, for each of the at least one circuit, power usage as a function of operation of the circuit;
for each of the at least one circuit, determining an operating state and a resulting power usage according to the look-up table; and determining the estimated total power usage as a sum of all resulting power usages determined from the look-up table.

14. The method of claim 13, wherein determining which converter module(s) to enable and which converter module(s) to disable comprises:
   determining a minimum number of converter modules that should be enabled in order to handle the estimated total power usage; and
   determining which converter module(s) to enable and which converter module(s) to disable in accordance with the minimum number of converter modules that should be enabled.

15. A non-transitory computer readable medium having stored thereon computer-executable instructions that when executed on a processor of an apparatus implement a method, the apparatus comprising a Direct Current to Direct Current 'DCDC' converter having a plurality of converter modules each configured to convert current at a first voltage level to another voltage form, the method comprising:
   determining on an ongoing basis an estimated total power usage for at least one circuit being powered by the DCDC converter;
   determining which converter module(s) to enable and which converter module(s) to disable based on the estimated total power usage; and
   dynamically enabling or disabling the converter modules accordingly;
   wherein determining the estimated power usage comprises:
      maintaining a look-up table identifying, for each of the at least one circuit, power usage as a function of operation of the circuit;
      for each of the at least one circuit, determining an operating state and a resulting power usage according to the look-up table; and
      determining the estimated total power usage as a sum of all resulting power usages determined from the look-up table.

16. The non-transitory computer readable medium of claim 15, wherein determining which converter module(s) to enable and which converter module(s) to disable comprises:
   determining a minimum number of converter modules that should be enabled in order to handle the estimated total power usage; and
   determining which converter module(s) to enable and which converter module(s) to disable in accordance with the minimum number of converter modules that should be enabled.

* * * * *